United States Patent [19]

O'Neill

[11] Patent Number: 4,488,619

[45] Date of Patent: Dec. 18, 1984

[54] FOAM-BARRIER-FOAM-FACING ACOUSTICAL COMPOSITE

[76] Inventor: Justin T. O'Neill, P.O. Box 175, Milford, Conn. 06460

[21] Appl. No.: 599,118

[22] Filed: Apr. 11, 1984

[51] Int. Cl.³ .................... E04B 1/82; C04B 43/00; B32B 3/06; B32B 5/32

[52] U.S. Cl. .................... 181/290; 181/288; 181/294; 181/DIG. 1; 428/198; 428/215; 428/286; 428/287; 428/316.6; 428/317.1; 428/319.7; 428/421; 428/473.5; 428/921

[58] Field of Search ......... 181/288, 290, 294, DIG. 1; 428/198, 215, 286, 287, 316.6, 317.1, 317.5, 317.7, 319.3, 319.7, 421, 422, 473.5, 921

[56] References Cited

U.S. PATENT DOCUMENTS 4,056,161 11/1977 Allen, Jr. ............................ 181/294
4,110,510 8/1978 Oliveira ........................... 428/319.7
4,340,129 7/1982 Salyers ............................ 428/319.7

FOREIGN PATENT DOCUMENTS 47229 3/1982 European Pat. Off. ......... 428/319.7
2822884 11/1979 Fed. Rep. of Germany ... 428/319.7
1362035 4/1964 France ............................ 428/316.6

Primary Examiner—William J. Van Balen

[57] ABSTRACT

A foam-barrier-foam-facing acoustical composite is disclosed having improved acoustical and flame retardant properties. The acoustical composite is a multilayered laminated fabric composed of: (a) a flame retardant polyvinyl fluoride facing layer; (b) a fire resistant acrylic adhesive layer bonded to the polyvinyl fluoride facing layer; (c) a first polyimide open cell foam layer bonded to the adhesive layer; (d) a noise barrier layer bonded to the first polyimide open cell foam layer, and (e) a second polyimide open cell foam layer bonded to the noise barrier layer.

40 Claims, 4 Drawing Figures

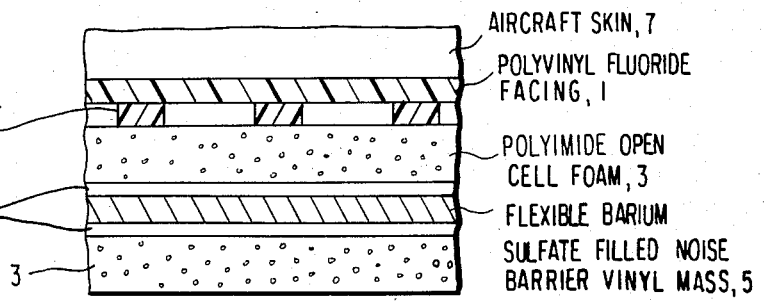
FIG. 1
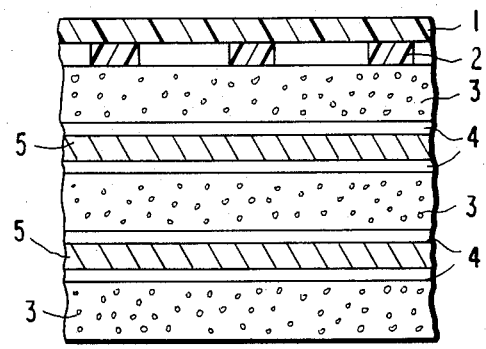
FIG. 2
FIG. 3   TIE DOWN PATTERN OF PRESSURE SENSITIVE ADHESIVE LAYER, 2
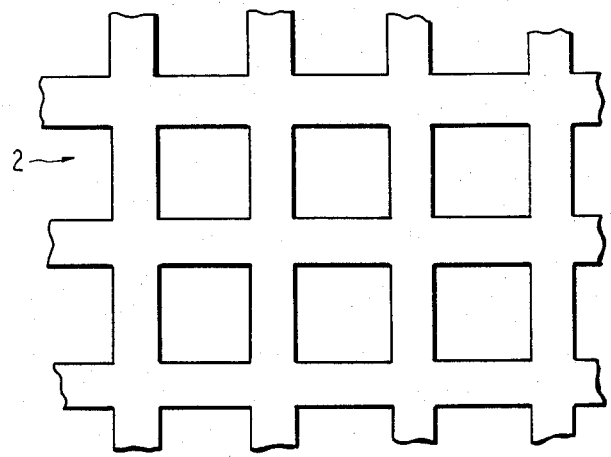

FOAM-BARRIER-FOAM-FACING ACOUSTICAL COMPOSITE

FIELD OF THE INVENTION

This invention relates to a foam-barrier-foam-facing acoustical composite, and, in particular, this invention relates to a foam-barrier-foam-facing acoustical composite which is especially but not exclusively useful in aircraft. Even more particularly, this invention relates to a foam-barrier-foam-facing acoustical composite which provides improved noise transmission loss and noise absorption, weight reduction, flammability resistance, smoke resistance and toxicity resistance compared to prior acoustical composites which have been used in similar embodiments.

BACKGROUND OF THE INVENTION

Over the years, many composites have been developed for reducing loud noise such as noise from heavy machinery, and engine noise from trucks and aircraft.

As an example of an acoustical composite currently used to reduce aircraft noise, there exists a composite comprising two pounds per cubic foot density fibrous glass wool sealed in polybag on both sides of a lead/vinyl sheeting.

In addition to the above-described foam-barrier-foam-facing acoustical composites for aircraft, acoustical composites of the foam-barrier type are known which provide noise transmission loss but do not provide noise absorption as well.

For example, U.S. Pat. No. 4,056,161, discloses a foam-barrier-wear layer composition which provides noise transmission loss. The outer wear layer can be polyvinyl chloride reinforced with fabric. The foam layer can be a low density polyester based polyurethane foam having open cells or pores. The intermediate high density barrier layer comprises a vinyl plastisol composition with a particulate material such as barium sulfate particles dispersed therein. The sound barrier layer also acts as a bonding layer for adhering both the outer layer and the foam layer. This product is used for tractor cab mats, fire wall barriers, headliners, etc. on heavy equipment vehicles, as well as for pipe wrap.

U.S. Pat. No. 4,110,510 discloses a sound barrier material comprised of a polyvinyl chloride impregnated fiber sheet or mat having a rubbery coating of a barium sulfate containing chlorinated polyethylene on each side. The fiber sheet or mat is preferably fiber glass. A foam, preferably polyurethane, having a density of 1.5 to 2.5 pounds per cubic foot is further laminated to one of the coating layers and functions as a decoupler to the mass barrier. This type of product is typically applied to noise enclosures and as pipe wrap for in-plant retrofit.

U.S. Pat. No. 4,340,129 discloses a flexible acoustical laminate construction comprising a weighted polymeric lamina having a surface density of at least about 0.5 lb/ft$^2$, and, adhered thereto, a polymeric foam composition designed to have a loss factor v of at least about 0.4 at 25° C. This acoustical laminate, like the two aforementioned, is a foam-barrier construction (decoupled mass) except that a highly plasticized polyvinylchloride foam is the decoupler rather than open cell polyurethane foam. This material is used, primarily, for cabliners in heavy equipment.

Despite the known compositions for reducing noise levels, there still remains room for improvement, and, in particular, there still remains room for improvement in acoustical composites which not only reduce noise transmission loss, as the above-mentioned foam-barrier type constructions, but which also absorb noise as well. Further, there remains room for improvement in acoustical composites which provide both noise transmission loss and noise absorption in aircraft and also are suitably light weight and flame and smoke retardant.

SUMMARY OF THE INVENTION

Accordingly, it is an object of this invention to provide a foam-barrier-foam-facing acoustical composite which has superior noise reduction qualities both with respect to noise transmission loss as well as noise absorption.

A further object of this invention is to provide a flexible foam-barrier-foam-facing acoustical composite which is suitably light weight for use in aircraft.

An even further object of this invention is to provide a flexible foam-barrier-foam-facing acoustical composite with superior flammability, smoke, and toxicity resistance.

The above objects are met by providing a multi-layered laminated fabric having improved acoustical and flame retardant properties comprising: (a) a flame retardant polyvinyl fluoride facing layer, (b) a fire resistant acrylic adhesive layer bonded to the polyvinyl fluoride facing layer, (c) a first polyimide open cell foam layer bonded to the adhesive layer, (d) a noise barrier layer bonded to the first polyimide open cell foam layer, and (e) a second polyimide open cell foam layer bonded to the noise barrier layer.

This invention also provides an acoustical composite as described above, further comprising repeated units of the noise barrier layer and the second polyimide open cell foam layer.

BRIEF DESCRIPTION OF THE DRAWINGS

FIG. 1 is a schematic cross-sectional view of one embodiment of the acoustical composite of the present invention.

FIG. 2 is a schematic, cross-sectional view of a second embodiment of the acoustical composite of the present invention.

FIG. 3 is a schematic diagram of a preferred tie-down pattern of the adhesive layer, 2, of the acoustical composite of the invention.

DETAILED DESCRIPTION OF THE INVENTION

Figure 4:
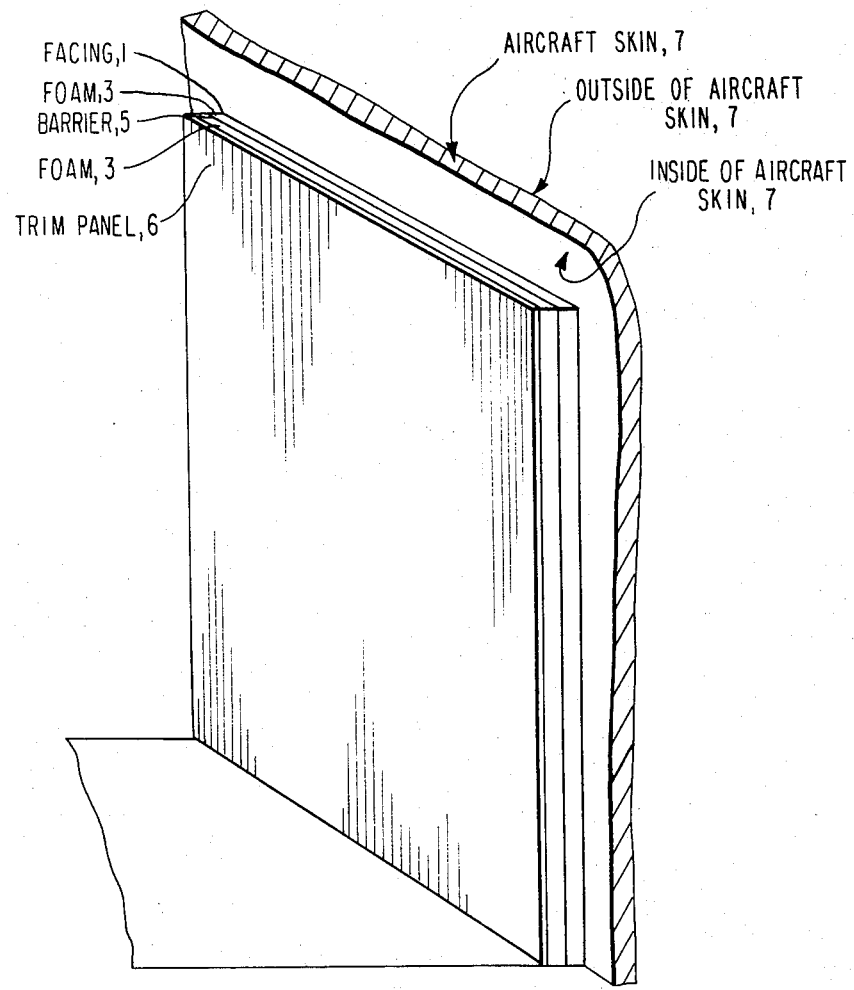
FIG. 4 is a schematic view of the acoustical composite of the present invention positioned in the aircraft.

The invention will now be described in detail with reference to the figures where appropriate.

FIG. 4 shows the application of the acoustical composite to the aircraft interior. The polyimide open cell absorbing foam layer side is the outside layer of the acoustical composite, i.e., the layer furthest from the source of the noise. That the polyimide open cell foam layer be the outside layer is critical for performance of the acoustical composite and is also one of the major distinctions between the present invention and known acoustical composites.

The foam-barrier-foam-facing acoustical composite is cemented to the rigid interior trim panel, 6, filling the cavity between the trim panel and the inside of the aircraft skin, 7. The polyvinyl fluoride facing layer side of the composite faces the aircraft skin and functions as an impervious membrane keeping oil out of the absorbing foam.

The foam-barrier-foam-facing acoustical composite can be cemented to the interior trim panel by means of a contact adhesive or a pressure sensitive adhesive. The polyvinyl fluoride facing layer can remain unattached to the aircraft skin.

One embodiment of the foam-barrier-foam-facing acoustical composite of the present invention is shown in detail in FIG. 1.

The flame retardant polyvinyl fluoride facing layer, 1, can be any conventional polyvinyl fluoride having flame retardants coated onto and/or incorporated into the layer. The facing layer is preferably one-half mil thick. In a preferred embodiment, the polyvinyl fluoride facing layer is reinforced with fiber such as fiber glass, rayon or polyester. In the most preferred embodiment, the polyvinyl fluoride facing layer is a one-half mil thick polyvinyl flouride, flame retardant film supported with 70 denier nylon 6×6 yarn per inch, weighing 0.95 ounce per square yard. A commercially available example is Orcofilm AN 18, manufactured by Orcon Corporation.

The acoustical composite of the present invention further contains a fire resistant acrylic adhesive layer, 2, bonded to the polyvinyl fluoride facing layer. The fire resistant acrylic adhesive may be any acrylic adhesive suitable for bonding polyvinyl fluoride to a polyimide foam, as long as the adhesive, when tested in a simulated composite, will pass the FAR 25.853(b) Flame Test described in more detail below. The fire resistant acrylic adhesive layer is preferably a pressure-sensitive adhesive layer. The adhesive layer is also preferred to be 5 mil thick.

In a most preferred embodiment, the fire resistant acrylic adhesive layer is disposed in a criss-crossed pattern of stripes of adhesive material as shown in FIG. 3. The criss-crossed pattern preferrably comprises adhesive stripes crossing at 90 degree angles on a 3-inch center distance and, most preferrably, the adhesive stripes are one inch wide.

A commercially available adhesive for bonding the facing to the foam in a criss-crossed pattern according to the most preferred embodiment is manufactured by 3M under the product number #Y-9461.

Further, according to the present invention there are polyimide open cell foam layers, 3, bonded to the first adhesive layer. The polyimide foam layers preferably have a density of about 0.6 to 1.0 pounds per cubic foot, and more preferably have a density of about 0.8 pounds per cubic foot. Further, the polyimide open cell foam layers are preferably one-fourth inch thick to one inch thick and more preferably one-fourth inch thick to one-half inch thick.

A suitable commercially available polyimide foam is Solimide TA-301, manufactured by Imi-Tech Corporation.

According to the present invention a noise barrier layer, 5, is positioned between successive polyimide open cell foam layers. The noise barrier layer is preferably a flexible barium sulfate filled vinyl mass barrier. The surface density of the noise barrier layer can be one-half to one and one-half pounds per square foot. Preferably the surface density is one-half to one pound per square foot. The noise barrier layer preferably has a fabric reinforcement. According to a most preferred embodiment, the noise barrier layer is a nylon reinforced barium sulfate filled polyvinyl chloride barrier material. Suitable commercially available noise barrier layer materials are RWB-5, RWB-7.5 and RWB-10 manufactured by E.A.R. Division, Cabot Corporation.

The noise barrier layer is bonded to the polyimide layers of means of any adhesive suitable for bonding polyvinyl halide material to polyimide foam, so long as the adhesive when tested in a simulated composite, will pass the FAR 25.853(b) Flame Test. Preferably, the adhesive is 5 mil thick and is a pressure sensitive adhesive. More preferably, the adhesive is a flame retardant acrylic adhesive.

A commercially available adhesive suitable for bonding the noise-barrier layer to the polyimide layer is Scotch A-60 #950 manufactured by 3M Corporation.

As shown in FIG. 1, one embodiment of the present invention comprises an acoustical composite having a foam-barrier-foam component. However, the acoustical composite of the present invention can also be comprised of additional alternating barrier-foam layers, one example of which is shown in FIG. 2.

The superior flame retardence of the present invention will now be demonstrated by reference to the Table below.

The flammability tests were run by an independent party in accordance with Federal Aviation Regulation No. 25.853(b), which is a known vertical flame test required by the Federal Aviation Administration for aircraft interior material.

In this test, the specimen is exposed to a flame for 12 seconds and then removed. The average burn length may not exceed 8 inches and the average flame time after removal of the flame source may not exceed 15 seconds. Drippings from the test specimen may not continue to flame for more than an average of 5 seconds after falling.

Foam/Barrier/Foam/Facing Samples 1, 2 and 3 were ¼ inch Solimide TA-301/1 lb Barrier RWB-10/¼ inch Solimide TA-301/Orcofilm AN-18. Samples Number 4, 5 and 6 were ¼ inch Solimide TA-301/½ lb Barrier RWB-10/½ inch Solimide TA-301/Orcofilm AN-18. Samples Number 7, 8 and 9 were ¼ inch Solimide TA-301/½ lb Barrier RWB-10/¼ inch Solimide TA-301/Orcofilm AN-18. Samples Number 10, 11 and 12 were ¼ inch Solimide TA-301/1 lb Barrier RWB-10/½ inch Solimide TA-301/Orcofilm AN-18.

The polyvinyl flouride facing layer was bonded to the polyimide open cell foam layer by means of a 5 mil thick pressure-sensitive acrylic adhesive disposed in a criss-crossed pattern of adhesive stripes one inch wide crossing at 90 degree angles on a 3-inch center distance. The noise barrier layer was bonded to the polyimide open cell foam layers by means of 5 mil thick pressure-sensitive acrylic adhesive.

TABLE

| Sample # | After Flame (sec.) | Burn Length (inches) | Dripping (sec.) |
| --- | --- | --- | --- |
| 1 | 1 | 0 | 0 |
| 2 | 14 | 1 | 0 |
| 3 | 1 | 0 | 0 |
| 4 | 0 | 0 | 0 |
| 5 | 9 | 0 | 0 |
| 6 | 3.9 | 0 | 0 |
| 7 | 1.9 | 0.5* | 0 |
| 8 | 0.75 | 0 | 0 |
| 9 | 0.5 | 0 | 0 |
| 10 | 1.75 | 0 | 0 |
| 11 | 2.5 | 0 | 0 |

TABLE-continued

| Sample # | After Flame (sec.) | Burn Length (inches) | Dripping (sec.) |
| --- | --- | --- | --- |
| 12 | 0 | 0 | 0 |

*Material does not burn. Burn Length only from pilot/ignition source.

As can be seen from the above Table, the results indicate high product performance in resistance to flame. The after flame time was very low; the burn length was zero in 10 out of 12 specimens; and, there were no drippings from any of the total number of specimens.

While the invention has been described in detail and with reference to specific embodiments thereof, it will be apparent to one skilled in the art that various changes and modifications can be made therein without departing from the spirit and scope thereof.

I claim:

1. A multilayered laminated fabric having improved acoustical and flame retardant properties comprising:
   (a) a flame retardant polyvinyl fluoride facing layer,
   (b) a fire resistant acrylic adhesive layer bonded to said polyvinyl fluoride facing layer,
   (c) a first polyimide open cell foam layer bonded to said adhesive layer,
   (d) a noise barrier layer bonded to said first polyimide open cell foam layer, and
   (e) a second polyimide open cell foam layer bonded to said noise barrier layer.

2. The article of claim 1, further comprising:
   (f) at least one repeated unit comprising a second noise barrier layer bonded to a third polyimide open cell foam layer.

3. The article of claim 1, wherein said polyvinyl fluoride facing layer is ½ mil thick.

4. The article of claim 2, wherein said polyvinyl fluoride facing layer is ½ mil thick.

5. The article of claim 1, wherein said polyvinyl fluoride facing layer is reinforced with fiber.

6. The article of claim 2, wherein said polyvinyl fluoride facing layer is reinforced with fiber.

7. The article of claim 3, wherein said polyvinyl fluoride facing layer is reinforced with fiber.

8. The article of claim 4, wherein said polyvinyl fluoride facing layer is reinforced with fiber.

9. The article of claim 1, wherein said fire resistant acrylic adhesive layer is 5 mil thick.

10. The article of claim 2, wherein said fire resistant acrylic adhesive layer is 5 mil thick.

11. The article of claim 1, wherein said fire resistant acrylic adhesive layer is disposed in a criss-crossed pattern of stripes of adhesive material.

12. The article of claim 2, wherein said fire resistant acrylic adhesive layer is disposed in a criss-crossed pattern of stripes of adhesive material.

13. The article of claim 11, wherein said criss-crossed pattern comprises adhesive stripes crossing at 90° angles on a 3-inch center distance.

14. The article of claim 12, wherein said criss-crossed pattern comprises adhesive stripes crossing at 90° angles on a 3-inch center distance.

15. The article of claim 13, wherein said adhesive stripes are 1 inch wide.

16. The article of claim 14, wherein said adhesive stripes are 1 inch wide.

17. The article of claim 15, wherein said adhesive layer is a pressure-sensitive adhesive layer.

18. The article of claim 16, wherein said adhesive layer is a pressure-sensitive adhesive layer.

19. The article of claim 1, wherein said polyimide foam layers have a density of about 0.6 to one pounds per cubic foot.

20. The article of claim 2, wherein said polyimide foam layers have a density of about 0.6 to one pounds per cubic foot.

21. The article of claim 19, wherein said polyimide foam layers have a density of about 0.8 pounds per cubic foot.

22. The article of claim 20, wherein said polyimide foam layers have a density of about 0.8 pounds per cubic foot.

23. The article of claim 19, wherein said polyimide foam layers are ¼ to ½ inch thick.

24. The article of claim 20, wherein said polyimide foam layers are ¼ to ½ inch thick.

25. The article of claim 21, wherein said polyimide foam layers are ¼ to ½ inch thick.

26. The article of claim 22, wherein said polyimide foam layers are ¼ to ½ inch thick.

27. The article of claim 1, wherein said noise barrier layer is a flexible barium sulfate filled vinyl mass barrier.

28. The article of claim 2, wherein said noise barrier layer is a flexible barium sulfate filled vinyl mass barrier.

29. The article of claim 27, wherein said noise barrier layer has a surface density of ½ to 1 pound per square foot.

30. The article of claim 28, wherein said noise barrier layer has a surface density of ½ to 1 pound per square foot.

31. The article of claim 29, wherein said noise barrier layer has fabric reinforcement.

32. The article of claim 30, wherein said noise barrier layer has fabric reinforcement.

33. The article of claim 31, wherein said vinyl mass is polyvinyl chloride.

34. The article of claim 32, wherein said vinyl mass is polyvinyl chloride.

35. The article of claim 1, wherein said polyimide open cell foam layers are bonded to said noise barrier layers with a 5 mil thick adhesive.

36. The article of claim 2, wherein said polyimide open cell foam layers are bonded to said noise barrier layers with a 5 mil thick adhesive.

37. The article of claim 35, wherein said adhesive is a pressure sensitive adhesive.

38. The article of claim 36, wherein said adhesive is a pressure sensitive adhesive.

39. The article of claim 37, wherein said adhesive is a flame retardant acrylic adhesive.

40. The article of claim 38, wherein said adhesive is a flame retardant acrylic adhesive.

* * * * *